(12) United States Patent
Plummer

(10) Patent No.: US 6,283,682 B1
(45) Date of Patent: *Sep. 4, 2001

(54) HELICALLY FLUTED TWIST DRILL DEVICE

(76) Inventor: Jerald D. Plummer, 5267 Swanson Rd., Roscoe, IL (US) 61073

(*) Notice: Subject to any disclaimer, the term of this patent is extended or adjusted under 35 U.S.C. 154(b) by 0 days.

This patent is subject to a terminal disclaimer.

(21) Appl. No.: 09/478,903

(22) Filed: Jan. 7, 2000

Related U.S. Application Data

(63) Continuation-in-part of application No. 08/940,347, filed on Sep. 30, 1997, now Pat. No. 6,045,305.

(51) Int. Cl.[7] ..................................................... B23B 27/10
(52) U.S. Cl. ......................... 408/57; 408/59; 408/144; 408/230; 408/713
(58) Field of Search ....................... 408/57, 59, 226, 408/227, 230, 233, 713, 144

(56) References Cited

U.S. PATENT DOCUMENTS

| | | | |
|---|---|---|---|
| 4,134,704 | * | 1/1979 | Jackley et al. ........................ 408/57 |
| 4,826,368 | * | 5/1989 | Tikal et al. ........................... 408/230 |
| 4,898,503 | * | 2/1990 | Barish ................................... 408/230 |
| 4,932,815 | * | 6/1990 | Krauss ................................... 408/227 |
| 5,046,902 | * | 9/1991 | Zubov et al. ......................... 408/230 |
| 6,045,305 | * | 4/2000 | Plummer ............................... 408/230 |

FOREIGN PATENT DOCUMENTS 3709647   10/1988   (DE) .

OTHER PUBLICATIONS

Besly Drills, Turboflute Drills are not just for Deep Hole Drilling, Catalog, Revised 1995, Besly Products Corp. 100 Dearborn Ave. S. Beloit IL 61080.

Hertel "T.F. Drill Solid Carbide Drills" Hertel 9041 Executive Pk Dr. Bldg 5 Knoxville TN 37923 Brochure. No Date.

Konet "Regrinding Procedures For KCC/KSC Drills" Brochure—No Date.

* cited by examiner

*Primary Examiner*—A. L. Wellington
*Assistant Examiner*—Monica S. Carter
(74) *Attorney, Agent, or Firm*—David J. Archer

(57) ABSTRACT

A helically fluted twist drill device is disclosed for cutting materials. The device includes a cylindrical core having a first diameter, a longitudinal axis and a first and a second extremity, the second extremity defining a cutting point. At least three portions extend helically outwardly away from the core so that the portions define a second diameter. The arrangement is such that adjacent portions define therebetween a helical flute. Each of the flutes has a flute surface which is of S-shaped configuration when viewed as a cross section disposed normal to the longitudinal axis, the cross section being viewed in a direction from the first towards the second extremity. Each of the portions further defines a helical bore connected to a source of a cutting fluid for permitting a flow of the cutting fluid through the bore towards the cutting point. The arrangement is such that in use of the device, the cutting fluid conveys the materials away from the cutting point through each flute. The first diameter has a dimension within a first range which is 20–35% of a dimension of the second diameter. Also, the second extremity of the core and adjacent portions is of cusp-shaped configuration for defining the cutting point so that wandering of the drill device is inhibited.

16 Claims, 7 Drawing Sheets

Fig. 4.
Prior Art.
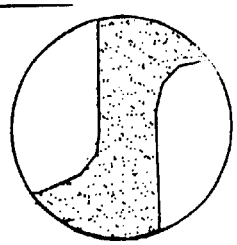
Fig. 5.
Prior Art.
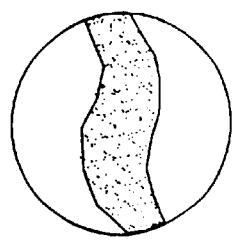
Prior Art.
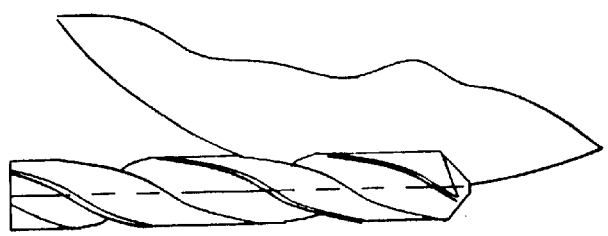
Fig. 7.
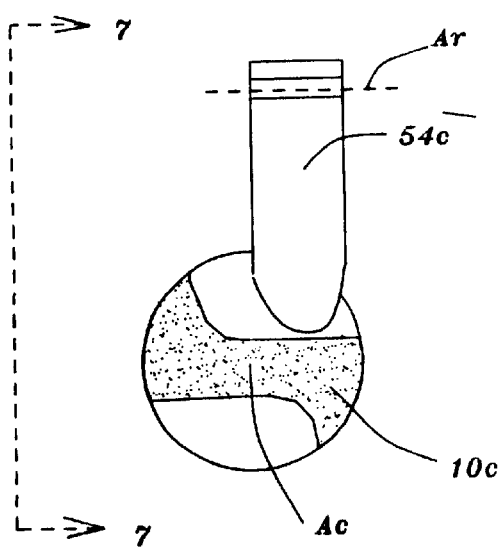
Fig. 6.
Prior Art.

HELICALLY FLUTED TWIST DRILL DEVICE

CROSS REFERENCE TO RELATED PATENT APPLICATION

The present application is a continuation-in-part of patent application U.S. Ser. No. 08/940,347 filed Sep. 30th 1997 now U.S. Pat. No. 6,045,305. All the subject matter of the aforementioned U.S. Ser. No. 08/940,347 is incorporated herein by reference.

BACKGROUND OF THE INVENTION

1. Field of the Invention

The present invention relates to a helically fluted twist drill device.

More specifically, the present invention relates to a helically fluted twist drill device for cutting materials.

2. Information Disclosure Statement

Three-flute twist drills otherwise known as core drills are primarily used for enlarging and finishing drilled, cast or punched holes. Generally, such three-flute drills will not produce original holes.

Some three-flute drills are manufactured by means of a process which includes the step of providing a cylindrical blank which defines three equidistantly spaced longitudinally extending flutes and bores.

The cylindrical blank or rod is extruded when it is still in its soft state. The extruded material is then heat treated or sintered to bring such material to its final state of hardness.

Subsequently, a helical flute is machined between adjacent bores such that the resultant machined twist drill includes three flutes or channels which extend helically from a shank portion disposed adjacent to one end of the blank to a second end of the blank.

Next, the second end of the blank is machined to provide a point. The bores are provided so that a cutting fluid under pressure can be fed through the twist drill while the drill is rotating at high speed. The cutting fluid flows from the shank to the point so that lubrication of the twist drill within the drilled hole is accomplished. Also, the cutting fluid flows from the point of the twist drill back through the flutes. Such flow of the cutting fluid from the point through the flutes conveys the cut material from the point towards the shank of the twist drill. The aforementioned process is known as chip evacuation.

Accordingly, it is desirable that the cross sectional area of the flutes or channels be as large as possible so as to avoid clogging of the same by chips or material being drilled or cut during the drilling operation.

Nevertheless, when large flutes are machined, there is a tendency to cut the flute in such a way that the surface of the flute exposes the adjacent bore. If such exposure occurs, the resultant twist drill will be useless.

Also, in order to machine the flutes, various shape grinding wheels have been required. The multiplicity of grinding wheels of various shapes has often been necessary in order to generate the flute form needed for that particular drill size. The use of special grinding wheels can be very expensive with a single wheel costing between $300.00–$400.00. Also, 12–15 different wheels are required in order to make various drill sizes.

Additionally, the operation of truing the form of the grinding wheels as such wheels wear is labor intensive.

The present invention overcomes the aforementioned problems by providing an arrangement in which twist drills of various sizes can be machined using a single straight grinding wheel such as a type IAI grinding wheel with a 1/32 inch–1/16 inch radius.

In the grinding operation according to the present invention, the axis of the grinding wheel is disposed at an approach angle within the range 2–4 degrees relative to the longitudinal axis of the twist drill.

Therefore it is a primary objective of the present invention to provide a fluted twist drill and a method of manufacturing the same which overcomes the problems associated with the prior art arrangements.

Another object of the present invention is the provision of a fluted twist drill having at least three flutes. Each flute defines a flute surface which when taken in a section normal to the longitudinal axis of the twist drill is of generally S-shaped configuration so that hooking the flutes is inhibited, that is the flutes have no undercut areas.

A further object of the present invention is the provision of a fluted twist drill having at least three flutes which can be manufactured in various sizes using a standard straight grinding wheel.

Other objects and advantages of the present invention will be readily apparent to those skilled in the art by a consideration of the detailed description contained hereinafter taken in conjunction with the annexed drawings.

SUMMARY OF THE INVENTION

The present invention relates to a helically fluted twist drill device for cutting materials. The device includes a cylindrical core having a first diameter, a longitudinal axis and a first and a second extremity, the second extremity defining a cutting point. At least three portions extend helically outwardly away from the core so that the portions define a second diameter. The arrangement is such that adjacent portions define therebetween a helical flute. Each of the flutes has a flute surface which is of S-shaped configuration when viewed as a cross section disposed normal to the longitudinal axis, the cross section being viewed in a direction from the first towards the second extremity. Each of the portions further defines a helical bore connected to a source of a cutting fluid for permitting a flow of the cutting fluid through the bore towards the cutting point. The arrangement is such that in use of the device, the cutting fluid conveys the materials away from the cutting point through each flute. The first diameter has a dimension within a first range which is 20–35% of a dimension of the second diameter. Also, the second extremity of the core and adjacent portions is of cusp-shaped configuration for defining the cutting point so that wandering of the drill device is inhibited.

Many modifications and variations of the present invention will be readily apparent to those skilled in the art by a careful consideration of the detailed description of the present invention described hereinafter taken in conjunction with the annexed drawings. However, such modifications and variations fall within the spirit and scope of the present invention as defined by the appended claims.

BRIEF DESCRIPTION OF THE DRAWINGS

FIG. 4. is a cross sectional view of a conventional prior art two flute twist drill;

FIG. 5 is a cross sectional view of a parabolic prior art two flute twist drill;

FIG. 6 is a cross sectional view of a conventional prior art two flute twist drill showing a portion of the grinding wheel with an axis of rotation disposed normal to the longitudinal axis of the drill;

FIG. 7 is a side view taken on the line 7—7 of FIG. 6;

Similar reference characters refer to similar parts throughout the various views of the drawings.

DETAILED DESCRIPTION OF THE DRAWINGS

Figure 1:
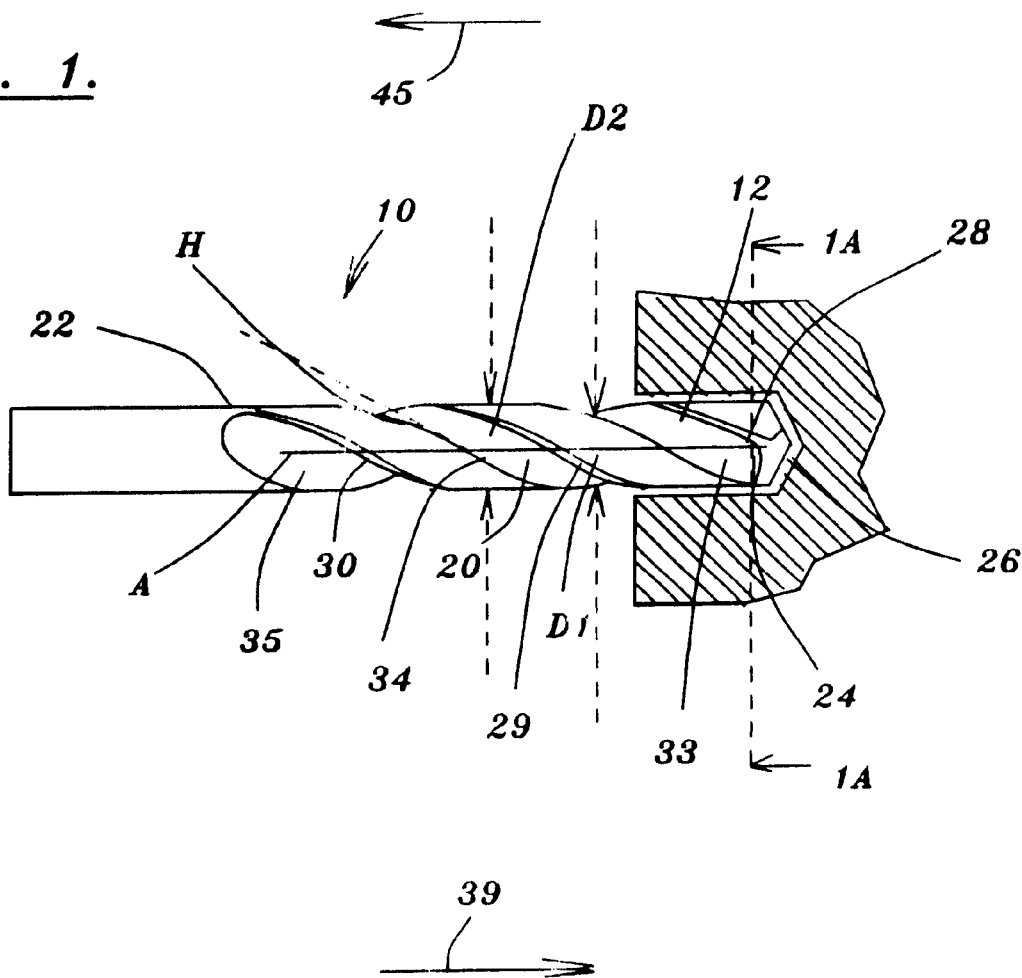
FIG. 1 is a side elevational view of a helically fluted twist drill according to the present invention.
Figure 1A:
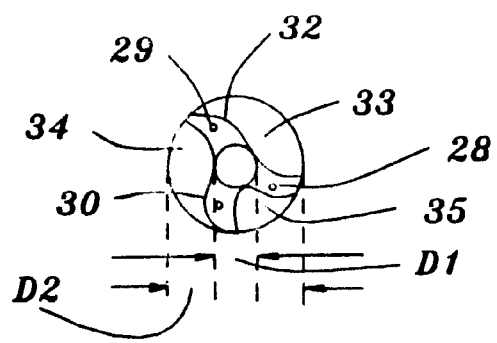
FIG. 1A is a sectional view taken on the line 1A—1A of FIG. 1.

FIG. 1 is a side elevational view of a helically fluted twist drill device generally designated 10 according to the present invention for cutting materials 12. The device includes a cylindrical core 20 having a first diameter D1, a longitudinal axis A and a first and a second extremity 22 and 24 respectively, the second extremity 24 defining a cutting point 26. At least three portions 28, 29 and 30 respectively extend helically outwardly away from the core 20 so that the portions 28–30 define a second diameter D2. FIG. 1A is a section taken on the line 1A—1A of FIG. 1.

FIG. 1A shows adjacent portions 28-29, 29-30 and 30-28 defining therebetween helical flutes 33, 34 and 35 respectively. Each of the flutes 33–35 has a flute surface 32 which is of S-shaped configuration when viewed as a cross section disposed normal to the longitudinal axis A, the cross section being viewed in a direction as indicated by the arrow 39 from the first extremity 22 towards the second extremity 24.

Figure 1B:
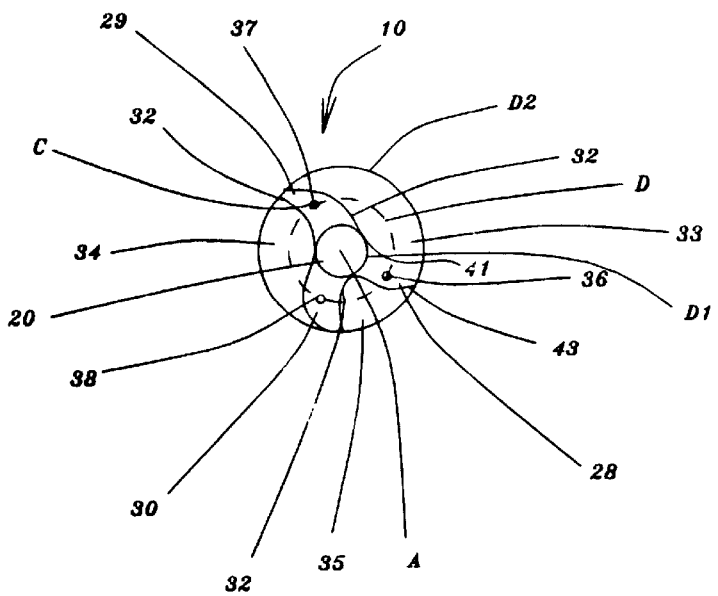
FIG. 1B is an enlarged view of FIG. 1A.

FIG. 1B is an enlarged view of FIG. 1A. FIG. 1B shows that each of the portions 28–30 further defines a helical bore 36, 37 and 38 connected to a source of a cutting fluid for permitting a flow of the cutting fluid through each bore 36–38 towards the cutting point 26. The arrangement is such that in use of the device 10, the cutting fluid conveys the materials 12 away from the cutting point 26 through each of the flutes 33–35 as shown in FIG. 1. The first diameter D1 has a dimension within a first range which is 20–35% of a dimension of the second diameter D2. Also, the second extremity 24 of the core 20 and adjacent portions 28–30 is of cusp-shaped configuration for defining the cutting point 26.

In a more specific embodiment of the present invention, each of the portions 28–30 extends helically around the core 20 between the first and the second extremities 22 and 24 respectively of the core 20. More particularly, each of the portions 28–30 extends helically around the core 20 from between the first and the second extremities 22 and 24 respectively of the core 20 to the second extremity 24 of the core 20.

Also, as shown in FIG. 1B, each of the portions 28–30 such as portion 28, in the vicinity of the second diameter D2, has a leading edge 41 and a heel clearance 43, the heel clearance 43 trailing behind the leading edge 41 in use of the drill device 10.

Furthermore, each of the portions 28–30 is helically disposed relative to the longitudinal axis A at a helix angle H within a range 25–35 degrees as shown in FIG. 1.

Additionally, each flute surface 32 is of sinusoidal configuration when viewed in a direction as indicated by the arrow 45 from the second extremity 24 towards the first extremity 22 of the core 20 for providing an increased flute cross-section for the passage therethrough of the materials 12 cut by the cutting point 26.

Moreover, each helical bore 34–36 extends from adjacent to the first extremity 22 of the core 20 to the second extremity 24 of the core 20.

Additionally, the cutting point 26 is formed by grinding the second extremity 24 of the core 20 with a grinding wheel and each bore 34–36 is disposed equidistantly from the longitudinal axis A as shown in FIG. 1B so that each bore 34–36 has a center C located on a diameter D having a dimension which is within a range 45–55% of a dimension of the second diameter D2.

Figure 1C:
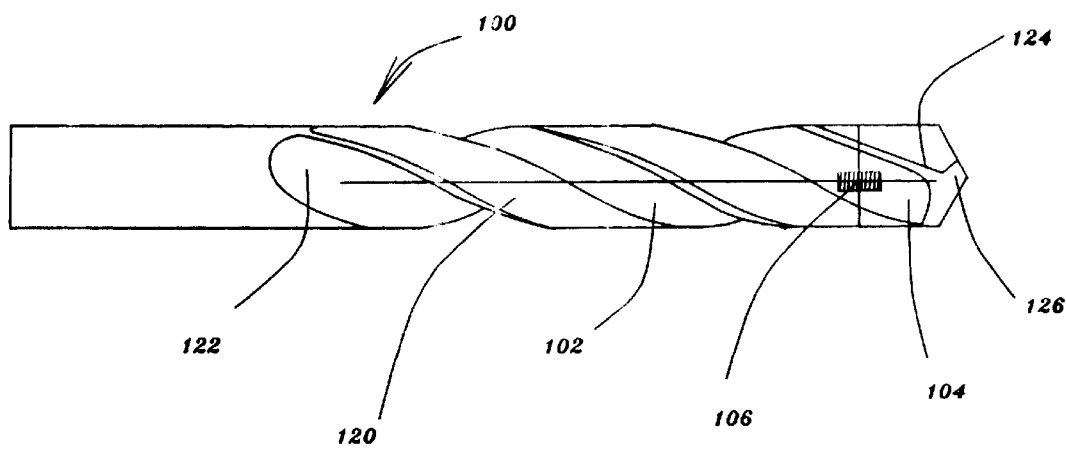
FIG. 1C is a side elevational view of a helically fluted twist drill according to a further embodiment of the present invention.

In yet another embodiment of the present invention as shown in FIG. 1C, a drill device 100 includes a first member 102 which extends from the first extremity 122 of the core 120 to between the first extremity 122 and the second extremity 124 of the core 120 and a second member 104 is secured to the first member 102, the second member 104 extending coaxially from the first member 102 to the cutting point 126. Preferably, the second member 104 is a cermet and a fastener 106 removably fastens the second member 104 to the first member 102 such that when the cutting point 126 becomes worn, the second member 104 is able to be replaced.

Figure 1D:
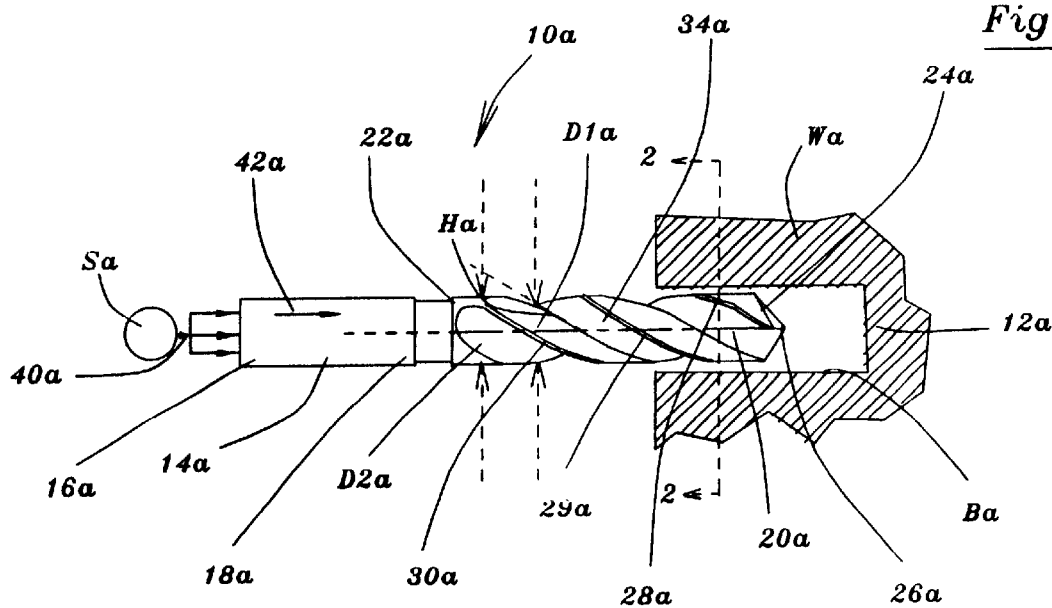
FIG. 1D is a side elevational view of a helically fluted twist drill according to yet another embodiment of the present invention.

FIG. 1D is a side elevational view a helically fluted twist drill device generally designated 10a according to another embodiment of the present invention. As shown in FIG. 1D, the helically fluted twist drill device 10a is designed for cutting materials 12a and particularly for finishing a bore Ba defined by a workpiece Wa. The twist drill device 10a includes a shank 14a having a first and a second end 16a and 18a respectively. A cylindrical core 20a has a first diameter D1a and a first and a second extremity 22a and 24a respectively. The core 20a extends coaxially relative to the shank 14a and from the second end 18a of the shank 14a. The second extremity 24a of the core 20a defines a point 26a.

Figure 2:
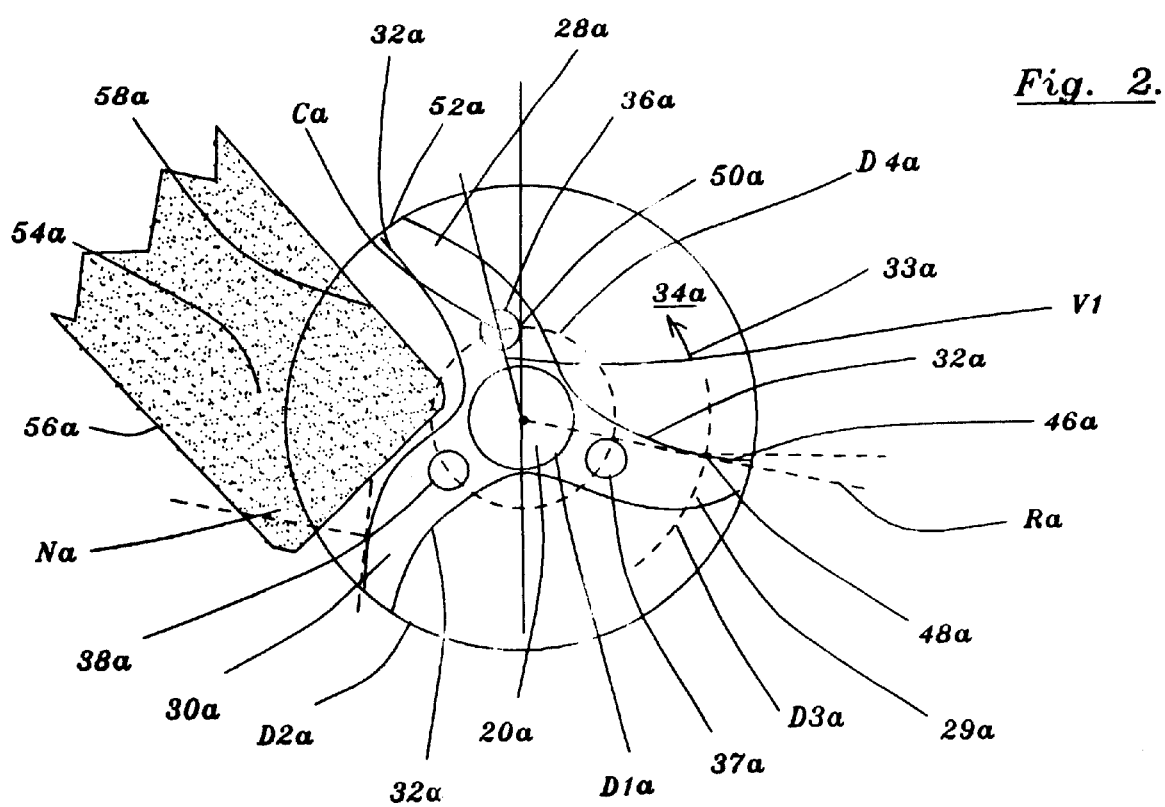
FIG. 2 is an enlarged sectional view taken on the line 2—2 of FIG. 1D, but showing how the grinding of the drill is accomplished.

FIG. 2 is an enlarged sectional view taken on the line 2—2 of FIG. 1D. FIG. 2 shows that at least three portions 28a, 29a and 30a respectively extend helically outwardly away from the core 20a so that the portions 28a–30a define a second diameter D2a. The arrangement is such that adjacent portions 28a–29a, 29a–30a and 30a–28a define therebetween a surface 32a of a helical flute 34a. Each of the portions 28a–30a further define a helical bore 36a, 37a and 38a respectively connected to a source Sa shown in FIG. 1D of a cutting fluid 40a for permitting a flow as indicated by the arrow 42a of the cutting fluid 40a through the bore 36a from the shank 14a towards the point 26a.

In use of the twist drill device 10a, the cutting fluid 40a conveys the cut materials 12a from the vicinity of the point 26a through each flute 34a towards the shank 14a. The first diameter D1a has a dimension within a first range I which is 20–35% and preferably 25–30% of a dimension of the second diameter D2a. Also, the surface 32a is machined such that intersection of the portions 28a–30a with any normal extending outwardly from the surface 32a is inhibited.

In a more specific embodiment of the present invention the shank 14a is of cylindrical configuration.

Also, as shown in FIG. 1D, the first extremity 22a of the core 20a extends from the second end 18a of the shank 14a.

Additionally, as shown in FIG. 2 which is an enlarged sectional view taken on the line 2—2 of FIG. 1D, the surface 32a in cross section is of sinusoidal configuration.

More specifically, the surface 32a in cross section from a first location 46a on the second diameter D2a defines a rake angle Ra within a second range II which is 1.5–2.5 degrees and preferably 2 degrees from a radius of the second diameter D2a passing through the first location 46a.

More particularly, the rake angle Ra is such that during rotation of the device 10a, the surface 32a adjacent to the second diameter D2a is of scoop shaped configuration for assisting in cutting and conveying the materials 12a in a direction as indicated by the arrow 33a from the point 26a towards the shank 14a.

Furthermore, the scoop shaped configuration of the surface 32a is deepest at a second location 48a which is disposed between the first and second diameter D1a and D2a respectively. The second location 48a is disposed on a third diameter D3a, the third diameter D3a being concentric with the first and second diameter D1a and D2a respectively. The third diameter D3a has a dimension which is within a third range III which is 8–15% and preferably 10–13% less than a dimension of the second diameter D2a.

In a preferred embodiment of the present invention, the portions 28a–30a extend helically along the core 20a, with each portion 28a–30a having a helix angle Ha within a fourth range IV which is 25–35 degrees and preferably 30 degrees.

Each bore fore example bore 36a has a center Ca located on a fourth diameter D4a. The fourth diameter D4a which is concentric to the other diameters D1a–D3a has a dimension within a fifth range V which is 45–55% and preferably 47–53% of the dimension of the second diameter D2a. More specifically, each center Ca is located on the fourth diameter D4a and the bore 36a has a wall 50a. The arrangement is such that a first radius of the device 10a extending through the center Ca and a second radius tangent to the wall 50a define therebetween an angle within a sixth range VI which is 8–12 degrees and preferably 10 degrees.

Adjacent surfaces of adjacent flutes define therebetween a land 52a which extends along a portion of the second diameter D2a. Each of the lands 52a is within a seventh range VII which is 8–12 mm and preferably 10 mm.

The twist drill device 10a defines an angle of approach within an eighth range VIII which is 1–4 degrees and preferably 2–4 degrees.

In one embodiment of the present invention, the drill device 10a is machined to a combination of:

a first range I a second range II a third range III a fourth range IV a fifth range V a sixth range VI a seventh range VII an eighth range VIII. The ranges I–VIII being as described hereinbefore.

Figure 3:
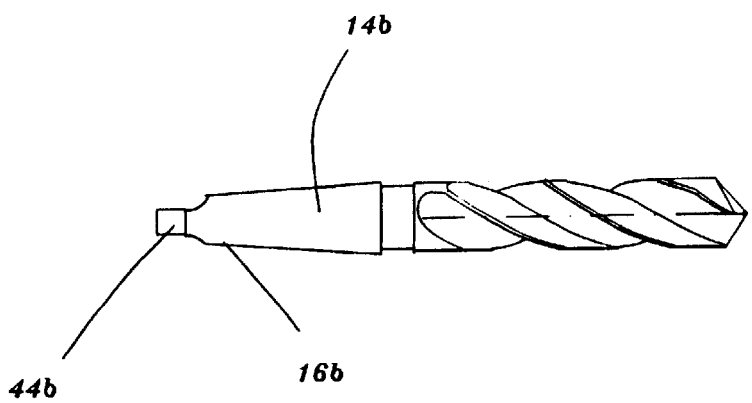
FIG. 3 is a side elevational view of a helically fluted twist drill according to an alternative embodiment of the present invention.

In yet another embodiment of the present invention as shown in FIG. 3, the shank 14b is tapered. Also, as shown in FIG. 3, a tang 44b extends from the first end 16b of the shank 14b.

FIG. 4. is a cross sectional view of a conventional prior art two flute twist drill.

FIG. 5 is a cross sectional view of a parabolic prior art two flute twist drill.

FIG. 6 is a cross sectional view of a conventional prior art two flute twist drill showing a portion of the grinding wheel 54c with axis of rotation Ar disposed normal to the longitudinal axis Ac of the drill 10c.

FIG. 7 is a side view taken on the line 7—7 of FIG. 6.

Figure 8:
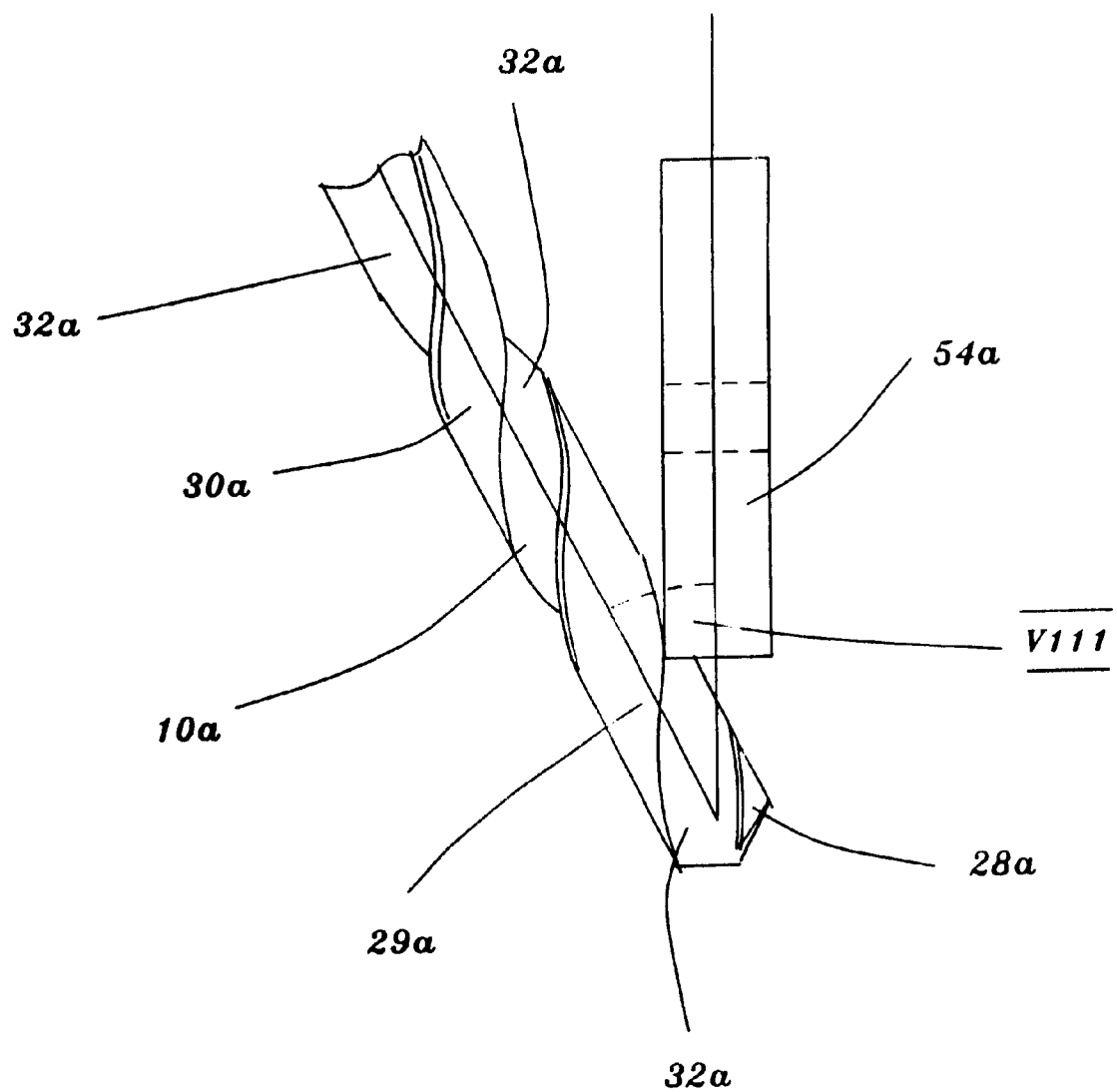
FIG. 8 is a side view of a parabolic three flute twist drill according to the present invention showing the angle of approach of the grinding wheel relative to the drill.

FIG. 8 is a side view of a parabolic three flute twist drill according to the present invention showing the angle of approach VIII of the grinding wheel 54a relative to the drill 10a.

The method according to the present invention includes grinding at least three helical flutes 32a between adjacent portions 28a–30a by means of a standard three inch straight IAI wheel 54a as shown in FIG. 2.

More specifically, because the side walls 56a and 58a of the wheel 54a are parallel and because no normal Na extending outwardly from the surface 32a intersects any of the portions 28a–30a, grinding of the flutes can be accomplished regardless of the size of the drill device 10a.

Figure 9:
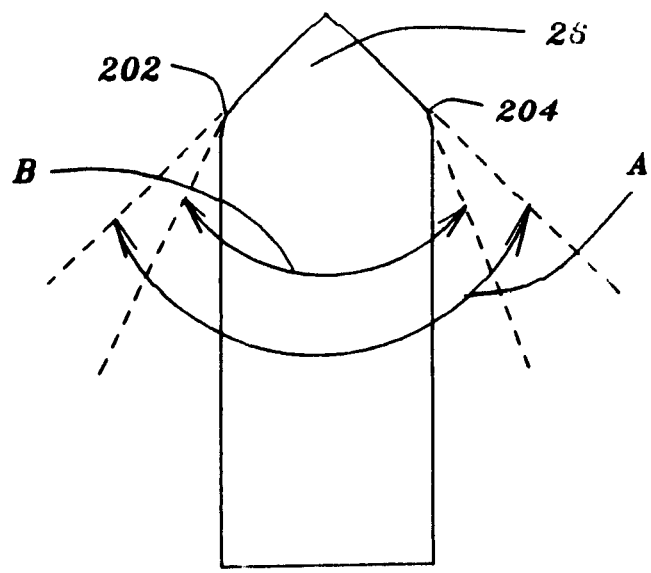
FIG. 9 is an enlarged view of the tip of the drill showing an alternative embodiment in which the corners are protected.

FIG. 9 is an enlarged view of the tip of the drill showing an alternative embodiment in which the corners are protected. More specifically, as shown in FIG. 9, the tip or cutting point 26 of the drill defines an angle A of approximately 130 degrees. However, the corners 202 and 204 include corner chamfers or protected corners so that in the region of these chamfers, the cutting point of the drill defines an angle B of 90 degrees. The terms protected corners, corner chamfer, corner radius and double angle point as used in the subject application have the same basic meaning.

Figure 10:
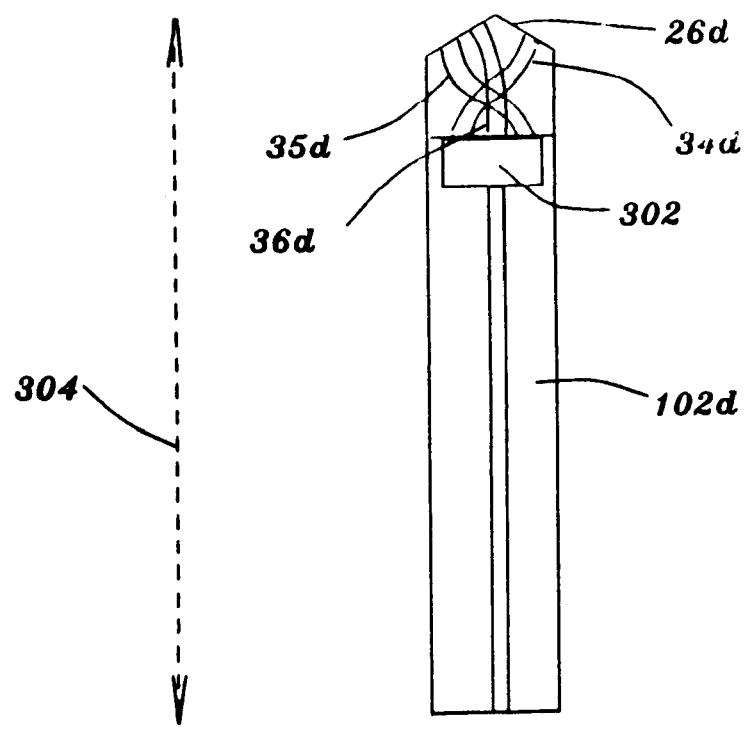
FIG. 10 is an enlarged view of an alternative embodiment of the present invention which includes a separate point.

FIG. 10 is an enlarged view of an alternative embodiment of the present invention which includes a separate point or cutting point 26d. The cutting point 26d is manufactured from tungsten carbide or the like and includes one or more bores 34d, 35d and 36d for conveying cutting fluid. The point 26d is secured to the end of the body 102d so that a plenum 302 is in fluid communication with the bores 34d–36d so that fluid is conveyed through the body 102d to the point and through the bores 34d–36d along the entire flight length 304.

The key features of the present invention include the provision of a twist drill having:

1) Three parabolic flutes for faster penetration. (A two flute drill does not penetrate as fast as a three flute drill.)

2) Through the tool coolant, for cooling, lubrication and chip evacuation.

Two of the biggest problems with drilling are the inability to eject chips fast enough and the problem of getting coolant to the point of the cut deep into the hole, which causes premature tool failure due to heat.

More specifically, in the drilling art the term "parabolic flute form" as used herebefore is used to describe a flute the surface of which when taken in a section normal to the longitudinal axis of the drill is of generally S-shaped that is sinusoidal configuration.

The aforementioned parabolic flute form provides more area for chip removal when compared with the more standard flute shape.

The present invention by a combination of machining angles and grinding ranges provides a twist drill having exceptionally large flute areas for the passage therethrough of cut materials so that drilling operations can be performed at extremely high speeds.

What is claimed is:

1. A helically fluted twist drill device for cutting materials, said device comprising:

a cylindrical core having a first diameter, a longitudinal axis and a first and a second extremity, said second extremity defining a cutting point;

at least three portions extending helically outwardly away from said core so that said portions define a second diameter, said portions being arranged such that adjacent portions define therebetween a helical flute;

each of said flutes having a flute surface which is of S-shaped configuration when viewed as a cross section disposed normal to said longitudinal axis, said cross section being viewed in a direction from said first towards said second extremity;

each of said portions further defining a helical bore connected to a source of a cutting fluid for permitting a flow of the cutting fluid through said bore towards said cutting point, the arrangement being such that in use of said device, the cutting fluid conveys the materials away from said cutting point through each flute;

said first diameter having a dimension within a first range which is 20–35% of a dimension of said second diameter; and said second extremity of said core and adjacent portions being of cusp-shaped configuration for defining said cutting point so that wandering of the drill device is inhibited.

2. A helically fluted twist drill device as set forth in claim 1 wherein each of said portions extends helically around said core between said first and said second extremities of said core.

3. A helically fluted twist drill device as set forth in claim 1 wherein each of said portions extends helically around said core from between said first and said second extremities of said core to said second extremity of said core.

4. A helically fluted twist drill device as set forth in claim 1 wherein each of said portions has, in the vicinity of said second diameter, a leading edge and a heel clearance, said heel clearance trailing behind said leading edge in use of said drill device.

5. A helically fluted twist drill device as set forth in claim 1 wherein each of said portions is helically disposed relative to said longitudinal axis at a helix angle within a range 25–35 degrees.

6. A helically fluted twist drill device as set forth in claim 1 wherein each flute surface is of sinusoidal configuration when viewed in a direction from said second towards said first extremity of said core for providing an increased flute cross-section for the passage therethrough of the materials cut by said cutting point.

7. A helically fluted twist drill device as set forth in claim 1 wherein each helical bore extends from adjacent to said first extremity of said core to said second extremity of said core.

8. A helically fluted twist drill device as set forth in claim 1 wherein said cutting point is formed by grinding said second extremity of said core with a grinding wheel.

9. A helically fluted twist drill device as set forth in claim 8 wherein each bore is disposed equidistantly from said longitudinal axis so that each bore has a center located on a diameter having a dimension which is within a range 45–55% of a dimension of said second diameter.

10. A helically fluted twist drill device as set forth in claim 1 wherein said drill device includes:

a first member which extends from said first extremity of said core to between said first and second extremities of said core;

a second member secured to said first member, said second member extending coaxially from said first member to said cutting point.

11. A helically fluted twist drill device as set forth in claim 10 wherein said second member is a cermet.

12. A helically fluted twist drill device as set forth in claim 10 further including:

a fastener for removably fastening said second member to said first member such that when said cutting point becomes worn, said second member is replaced.

13. A helically fluted twist drill device as set forth in claim 1 wherein said cutting point defines an angle of approximately 130 degrees;

said cutting point having corners which include corner chamfers so that in the region of such chamfers, said cutting point of the drill defines an angle of approximately 90 degrees.

14. A helically fluted twist drill device as set forth in claim 10 wherein said second member is a separate cutting point, said cutting point being manufactured from tungsten carbide;

said cutting point defining at least one bore for conveying cutting fluid;

said cutting point being secured to said first body so that a plenum defined by said first body is in fluid communication with said bore so that fluid is conveyed through the first body to said cutting point and through said bore along an entire flight length of the drill.

15. A helically fluted twist drill device for cutting materials, said device comprising:

a cylindrical core having a first diameter, a longitudinal axis and a first and a second extremity, said second extremity defining a cutting point;

at least three portions extending helically outwardly away from said core so that said portions define a second diameter, said portions being arranged such that adjacent portions define therebetween a helical flute;

each of said flutes having a flute surface which is of S-shaped configuration when viewed as a cross section disposed normal to said longitudinal axis, said cross section being viewed in a direction from said first towards said second extremity;

each of said portions further defining a helical bore connected to a source of a cutting fluid for permitting a flow of the cutting fluid through said bore towards said cutting point, the arrangement being such that in use of said device, the cutting fluid conveys the materials away from said cutting point through each flute;

said first diameter having a dimension within a first range which is 20–35% of a dimension of said second diameter;

said second extremity of the drill device being of cusp-shaped configuration for defining said cutting point;

said drill device including:
- a first member which extends from said first extremity of said core to between said first and second extremities of said core;
- a second member secured to said first member, said second member extending coaxially from said first member to said cutting point: and
- a fastener for removably fastening said second member to said first member such that when said cutting point becomes worn, said second member is replaced.

16. A helically fluted twist drill device for cutting materials, said device comprising:
- a cylindrical core having a first diameter, a longitudinal axis and a first and a second extremity, said second extremity defining a cutting point;
- at least three portions extending helically outwardly away from said core so that said portions define a second diameter, said portions being arranged such that adjacent portions define therebetween a helical flute;
- each of said flutes having a flute surface which is of S-shaped configuration when viewed as across section disposed normal to said longitudinal axis, said cross section being viewed in a direction from said first towards said second extremity;
- each of said portions further defining a helical bore connected to a source of a cutting fluid for permitting a flow of the cutting fluid through said bore towards said cutting point, the arrangement being such that in use of said device, the cutting fluid conveys the materials away from said cutting point through each flute;
- said first diameter having a dimension within a first range which is 20–35% of a dimension of said second diameter;
- said second extremity of the drill device being of cusp-shaped configuration for defining said cutting point;

said drill device including:
- a first member which extends from said first extremity of said core to between said first and second extremities of said core;
- a second member fabricated from a cermet, said second member being secured to said first member, said second member extending coaxially from said first member to said cutting point; and
- a fastener for removably fastening said second member to said first member such that when said cutting point becomes worn, said second member is replaced.

* * * * *